United States Patent [15] 3,657,794
Palumbo et al. [45] Apr. 25, 1972

[54] METHOD AND APPARATUS FOR POSITIONING PARTS

[72] Inventors: Donald R. Palumbo, Chula Vista; John V. Platt, Imperial Beach; Leon Noeggerath, National City; Laurence Johnston, Jr., Spring Valley; Robert G. Aleckna, San Diego, all of Calif.

[73] Assignee: Rohr Corporation, Chula Vista, Calif.

[22] Filed: Mar. 9, 1970

[21] Appl. No.: 17,512

[52] U.S. Cl..............................29/429, 29/155 R, 29/200 J, 29/200 P
[51] Int. Cl. .....................................B23p 19/00, B23p 17/00
[58] Field of Search....................29/200 J, 200 P, 429, 155 R

[56] References Cited

UNITED STATES PATENTS

| 1,860,980 | 5/1932 | Bates | 29/200 P |
| 3,183,581 | 5/1965 | Lister | 29/155 R X |
| 3,277,556 | 10/1966 | Platt et al. | 29/200 J X |
| 3,380,147 | 4/1968 | McDonald | 29/429 |

Primary Examiner—Thomas H. Eager
Attorney—George E. Pearson

[57] ABSTRACT

Apertured members are fixedly positioned on a rod and respectively attached to stands supported on a flat surface to thereby place the rod in predetermined spatial relation with the latter. Rings are fixedly positioned on the rod, and parts such as weld jigs are engaged with the rings to thereby align said parts relative to said surface.

11 Claims, 10 Drawing Figures

PATENTED APR 25 1972

INVENTOR
D. PALUMBO   J. PLATT
L. NOEGGERATH
L. JOHNSTON   R. ALECKNA

BY Edwin D. Grant
ATTORNEY

INVENTOR.
D. PALUMBO   J. PLATT
L. NOEGGERATH
L. JOHNSTON   R. ALECKN

BY *Edwin D. Grant*
ATTORNEY

INVENTOR.
D. PALUMBO   J. PLATT
L. NOEGGERATH
L. JOHNSTON   R. ALECKNA

BY Edwin D. Grant
ATTORNEY

METHOD AND APPARATUS FOR POSITIONING PARTS

SUMMARY OF THE INVENTION

This invention relates to a method and apparatus for positioning parts in predetermined spatial relation. Although not limited thereto, the invention has particular advantage for setting locators in weld jigs.

Briefly described, apparatus in accordance with the present invention comprises means for positioning a rod in predetermined relation with a reference plane, and means for locating a part at a predetermined point on said rod and in predetermined angular relation therewith. More particularly, in a preferred form of the invention apertured members (hereinafter called "mounting members") are slidably mounted on a rod for movement axially thereof, and means are provided for fixing the same in selected positions on said rod. The mounting members are respectively secured to blocks (hereinafter called "elevation locators") which in turn are respectively slidably mounted on stands supported on a flat reference surface, means being provided to fixedly position each elevation locator on its associated stand at a selected height above said surface. At least one ring is slidably mounted on the rod for movement axially thereof, and means are provided to fixedly position this ring at a selected point on said rod. Thus by locating the longitudinal axis of the rod so that it coincides with the longitudinal axis of a portion of a pipe, or other article which must be fabricated by joining together elongate members, and by then locating the aforesaid ring at a selected point on said rod, a weld jig or other part can conveniently be aligned in a predetermined position by abutting it against the ring.

DETAILED DESCRIPTION

Figure 1:
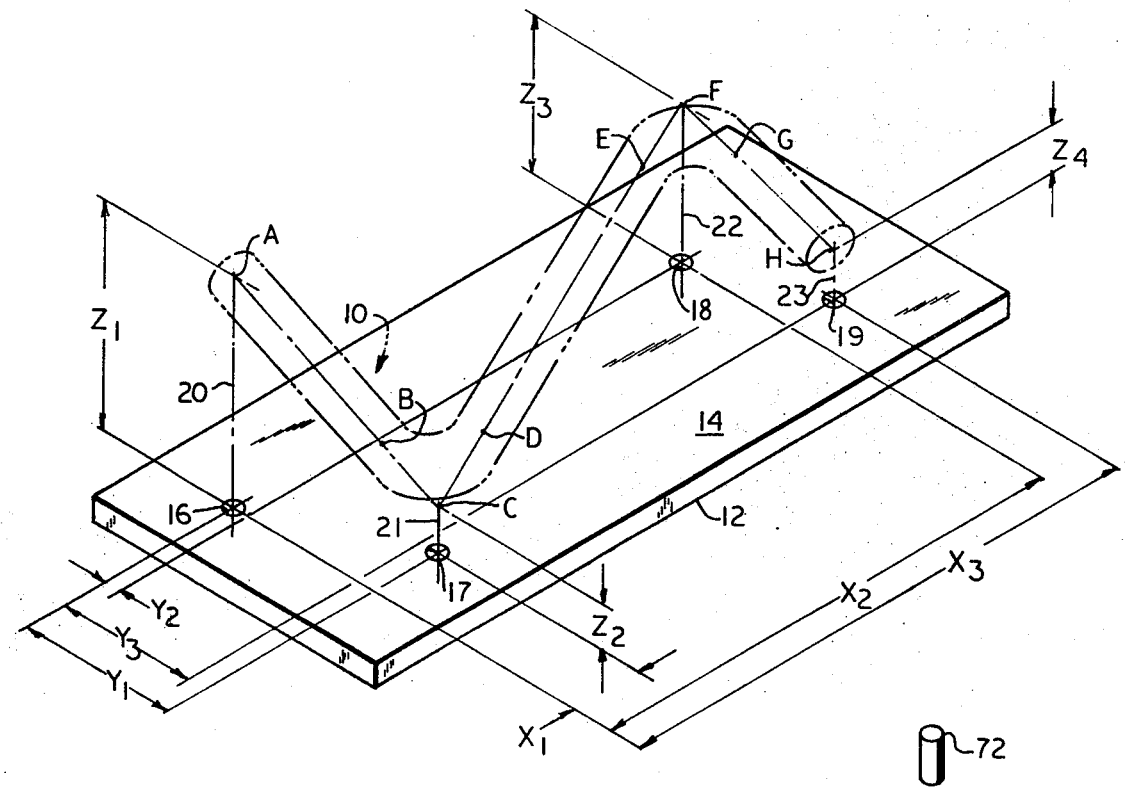
FIG. 1 is a pictorial view of a pipe and a plate which serves as a support for a weld jig that is used in aligning sections of said pipe during its fabrication.

In FIG. 1 phantom lines illustrate a pipe 10 formed of separate straight and curved sections joined together by suitable means, such as welding. More specifically, pipe 10 is straight between the following pairs of points on its longitudinal axis: A and B; D and E; and G and H. Point C is located at the intersection of the two lines which extend through points A and B, and D and E, respectively, which lines will be hereinafter designated by points lying thereon, e.g., the line which extends through points A and C will be designated line AC. Likewise, point F is located at the intersection of the line which passes through points C, D and E and the line which passes through G and H. The same drawing also illustrates a support 12 having thereon a flat surface 14 which serves as a plane of reference for location of the aforementioned points, as will be seen hereinafter. In the preferred method of aligning parts in accordance with this invention, holes 16–19 are formed in support 12 so that stands can subsequently be pivotally connected thereto. For this purpose hole 16 is formed in the plate in coaxial relation with the line 20 which is perpendicular to surface 14 and which passes through point A, and holes 17, 18 and 19 are likewise formed in the plate in coaxial relation with lines 21, 22 and 23, respectively, which are also perpendicular to said surface and which respectively pass through points C, F and H. The centers of holes 16–19 (which preferably have the same diameter) are located on surface 14 through the use of X, Y coordinates, and the elevations of points A, C, F and H are established by the use of Z coordinates, as illustrated.

To form a plurality of pipes 10 of separate straight and curved sections as illustrated in FIG. 1, a weld jig is employed to align said sections in the required spatial relation to one another. As will be seen hereinafter, the weld jig is itself aligned in proper position by means of the apparatus illustrated in FIGS. 2–10, which comprises a plurality of stands each of which is generally designated in the drawings by reference number 24 and is adapted to be pivotally connected to support 12. More particularly, each stand is provided with a flat base 30, and a hole 32 (see FIG. 3) extends through this base in perpendicular relation to the lower surface thereof. A pin 34 is dimensioned so that it can be inserted through hole 32 in the base of a stand and then bottomed in one of the holes 16–19 in support 12 while one end thereof projects into said base, the diameter of said pin being slightly less than the diameters of said holes so that the pin can be removably engaged therein. Thus, when a pin 34 is disposed within a hole 16–19 and a hole 32 of a stand, said stand can be pivoted about the longitudinal axis 36 of the hole.

Each stand 24 also comprises a post 38 which is fixedly attached to the upper surface of its base and the longitudinal axis of which is disposed in spaced, parallel relation with the longitudinal axis 36 of hole 32, said post thus being perpendicular to surface 14 of support 12 when said base is supported thereon. Mounted on each stand is an elevation locator, generally designated 40, which comprises a slotted block 42 adapted to slidably engage front and side surfaces of post 38 and a plate 44 which is attached to block 42 by means of screws (not shown) and adapted to slidably engage the rear surface of said post. A cylindrical projection 46 extends perpendicularly from the front face of block 42, the free end of said projection having formed therein a cavity, or socket, which is identified by reference number 48 and the wall of which is substantially hemispherical in shape. The length of projection 46 and the shape of the socket therein are such that when a spherical mounting member 50 is seated within the latter, the center of said mounting member lies on the extension of the longitudinal axis 36 of hole 32 in base 30. Furthermore, when the base of a stand 24 is supported on support 12 the centerline 51 of the socket in projection 46 is parallel with surface 14 and intersects the center of mounting member 50. Three threaded holes 52 extend perpendicularly from the front face of block 42 and are respectively centered on lines parallel with, and perpendicular to, the longitudinal axis of post 38, each hole 52 being located adjacent a respective one of the edges of said block. Each stand is provided with a cap screw 54 the shank of which extends through a hole 55 in a U-shaped clamping member 56 and the threaded end of which can be turned into a selected one of the holes 52 in block 42 to thereby press the legs of said clamping member against mounting member 50 and hold the latter in seated relation within the socket in projection 46. A projection 58 extends laterally from one vertical side of block 42, and the upper surface 60 of this projection is coplanar with the centerline 51 of the socket in projection 46 and parallel with surface 14 when base 30 is supported thereon.

Figure 10:
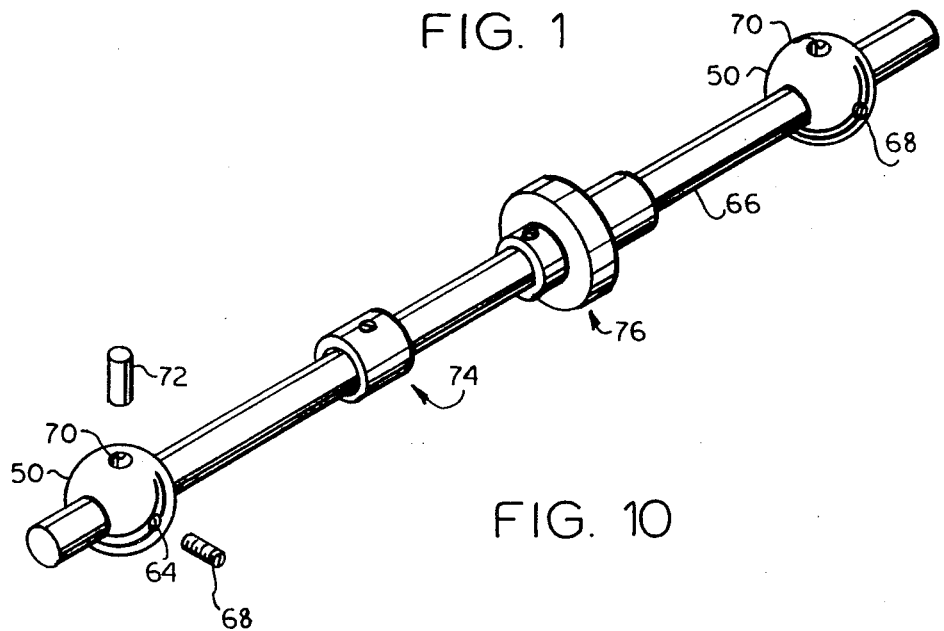
FIGS. 9 and 10 are pictorial views of components of said apparatus, illustrating alternative methods of positioning said components in predetermined spatial relation.
Figure 2:
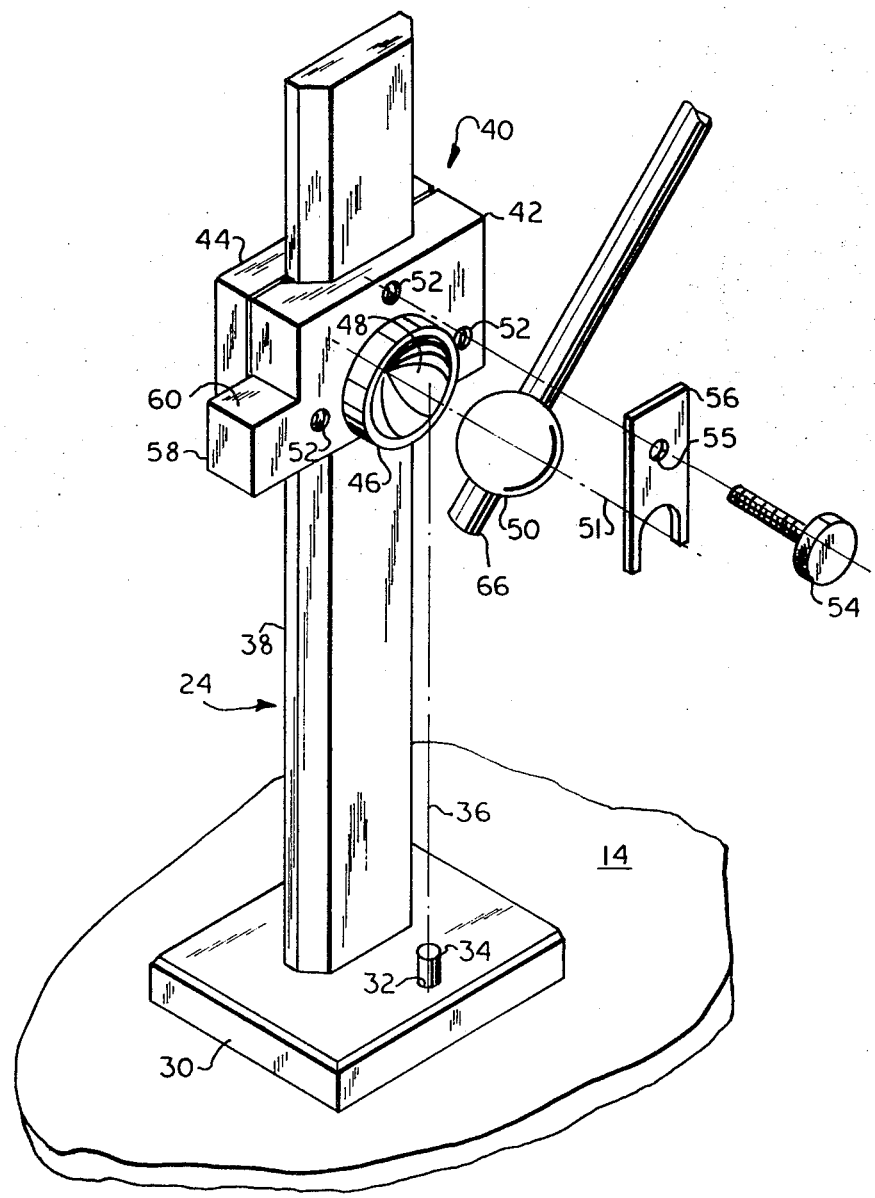
FIG. 2 is a pictorial view of components of the preferred embodiment of the invention.
Figure 3:
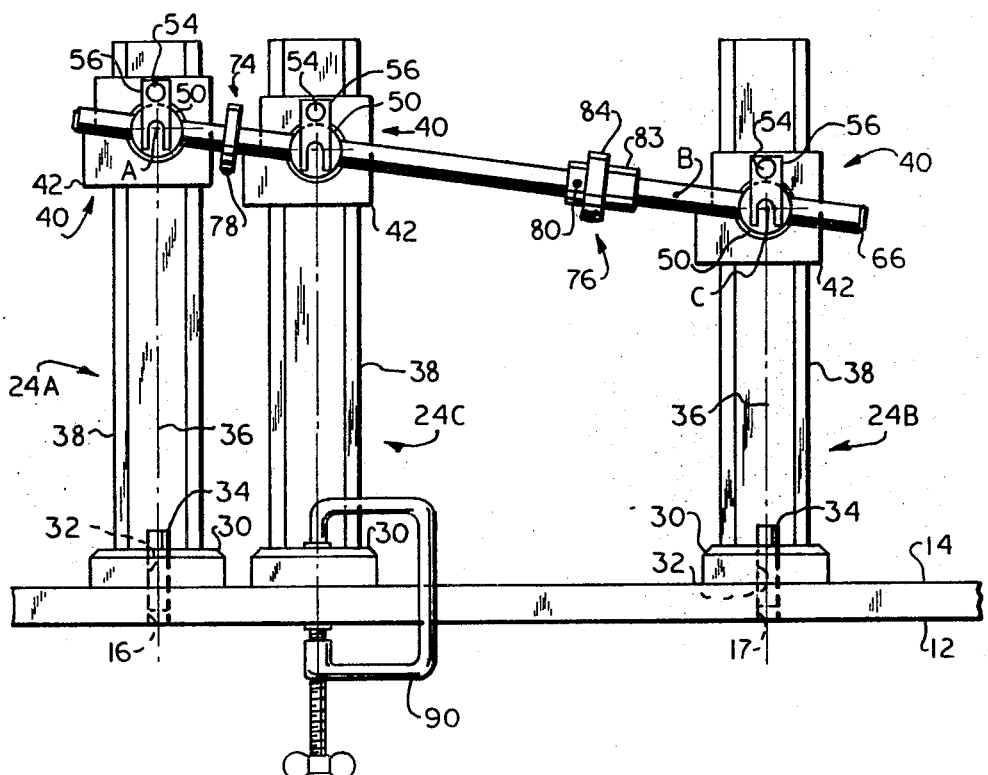
FIG. 3 is an elevational view illustrating a step in the use of the apparatus shown in FIG. 2.
Figure 4:
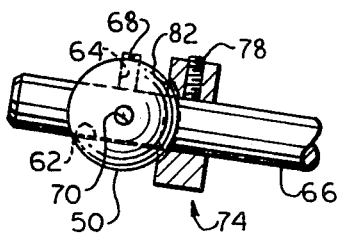
FIG. 4 is a detail view of components shown in FIG. 3, one of which is illustrated in cross section.
Figure 5:
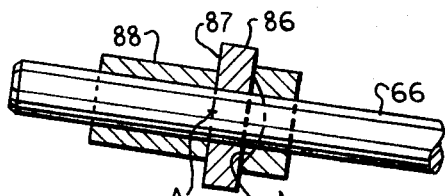
FIG. 5 is a detail view illustrating another step in the use of said apparatus, the drawing illustrating locator rings in cross section.

A first hole 62 (shown as a broken line in FIG. 4) extends diametrically through mounting member 50, and a second hole 64 extends transversely from said first hole to the outer surface of said mounting member. The diameter of the aforesaid first hole in mounting member 50 is slightly larger than the diameter of a rod 66, thus permitting the latter to be slidably disposed within said first hole. To fix the mounting member at a selected point on rod 66, a set screw 68 can be turned within second hole 64 so as to engage its inner end with said rod. As best illustrated in FIG. 10, a third hole 70 extends from the aforesaid first hole perpendicularly thereof to the outer surface of the mounting member along a radius thereof, and a pin 72 is sized so that it can be removably positioned in said third hole with one end thereof projecting therefrom. Pin 72 may either be removed from hole 70 when mounting member 50 is clamped to stand 26, or may extend between the legs of clamping member 56. In FIG. 3 two locator rings 74, 76 are slidably mounted on rod 66, each ring being provided with a set screw 78, 80 which enables it to be fixed at a selected position on said rod. Locator ring 74 has a socket 82 (see FIG. 4) coaxially formed in one end surface thereof, and locator ring 76 is formed with a small diameter portion 83 and a shoulder or flange portion 84 which is disposed between the ends of said small diameter portion and the sides of which are perpendicular to the longitudinal axis of the rod. Two other locator rings 86, 88 of different form are illustrated in FIG. 5 and will be described hereinafter.

For the purpose of illustrating a method of using the above-described apparatus, it will be assumed that pipe 10 is to be formed by first positioning straight sections of pipe so that their longitudinal axes respectively coincide with lines AC, CF and FH and their ends respectively terminate at planes which are perpendicular to the longitudinal axes of said lines and which respectively pass through points A, B, D, E, G and H. After the aforesaid straight sections of pipe are so positioned curved sections can be welded or otherwise coupled to the adjacent ends thereof to complete the length of pipe 10 which lies between points A and H.

To align positioning members, or locators, at points A and B so that the section of straight pipe which will extend between these points can be precisely positioned, holes 16 and 17 are formed in support 12 so that their longitudinal axes respectively intersect points A and C and extend perpendicularly from surface 14, as described hereinbefore. The pins 34 of two stands 24A, 24B are then respectively positioned in these holes, as illustrated in FIG. 3. Before these stands are pivoted to support 12, their elevation locators 40 are respectively fixedly positioned on posts 38 so that the centerlines of the sockets in projections 46 of said elevation locators are respectively located at the elevations of points A and B relative to reference surface 14. This can readily be accomplished by placing the stands on surface 14 and using height indicators to position surfaces 60 on blocks 42 of said stands at the required elevations. A third stand 24C is positioned between the two stands which are pivoted to the support and a rod 66 having the two locator rings 74, 76 and three mounting members 50 mounted thereon is secured to said stands by respectively seating the mounting members in the sockets in projections 46 thereof and then engaging clamping members 56 with the mounting members. Before rod 66 is secured to the three stands the two outermost mounting members 50 are fixed in position on said rod by engaging their set screws 68 therewith, the distance between the centers of said outermost mounting members being set equal to the distance between points A and C on line AC of FIG. 1. In addition, locator ring 76 is fixed in position on the rod by engaging its set screw 80 therewith, the distance between the surface of the smaller end of said ring and the center of the mounting member 50 which is secured to stand 24A being less than the distance between points A and B on said line AC. The proper spacing of the two outermost mounting members and locator ring 76 on rod 66 can be attained by methods which will be described hereinafter. It will be understood from the foregoing description that after the mounting members are secured to stands 24A and 24B their centers are located at points A and C, respectively. Stand 24C is then fixed in position on support 12 by suitable means, such as a C-clamp 90. Alternatively, stand 24C can also be pivoted to the support by forming a hole in the latter and positioning a pin 34 in said hole and in the hole 32 of said stand. Clamping member 56 of stand 24A is then disengaged from the mounting member 50, the pin 34 which extends through the hole 32 of the base of the same stand is removed from hole 16, and the stand is then removed from support 12. As illustrated in FIG. 4, locator ring 74 is moved against the mounting member 50 which was attached to stand 24A to thereby seat the socket 82 of said locator ring against said mounting member, after which the locator ring is fixed in position on rod 66 by tightening set screw 78 against the latter. The mounting member 50 which abuts locator ring 74 is next removed from rod 66, and locator rings 86, 88 are placed thereon in abutting relation with said locator ring 74 and each other as illustrated in FIG. 5. As will be noted in FIG. 5, the socket in one end of locator ring 74 is formed so that when a mounting member 50 is seated within said socket as illustrated in FIG. 4 and then removed to permit the engagement of locator ring 86 with the same side of said ring 74, the side 87 of said ring 86 which is remote from the latter lies in a plane which extends through point A of FIG. 1 (i.e., side 86 of locator ring 86 lies in a plane which included the center of the mounting member 50 which was attached to stand 24A). Illustrated in pictorial view in FIG. 6 and in cross section in FIG. 7 is an L-shaped end locator 92 which has a counterbored aperture 93 extending through one leg 94 thereof. More explicitly, the longitudinal axis of aperture 93 is perpendicular to the sides of the locator leg in which it is formed, the diameter of the larger portion of said aperture is slightly greater than the diameter of pipe 10, and locator rings 86 and 88 respectively fit closely within the larger and smaller portions of said aperture as illustrated in FIG. 7. Thus the arrangement of the disclosed apparatus is such that locator 92 can be abutted against locator ring 86 with the wall of the large diameter portion of aperture 93 concentrically disposed about line AC of FIG. 1 and with the shoulder 96 of said aperture lying in a plane in a plane which is perpendicular to said line AC and which passes through point A thereon. After locator 92 has been aligned as described it can be fixed in position by any suitable means, such as by securing an angle 100 to support 12 and connecting leg 98 of said locator to said angle by means of suitable bolts and dowels (not shown).

Figure 6:
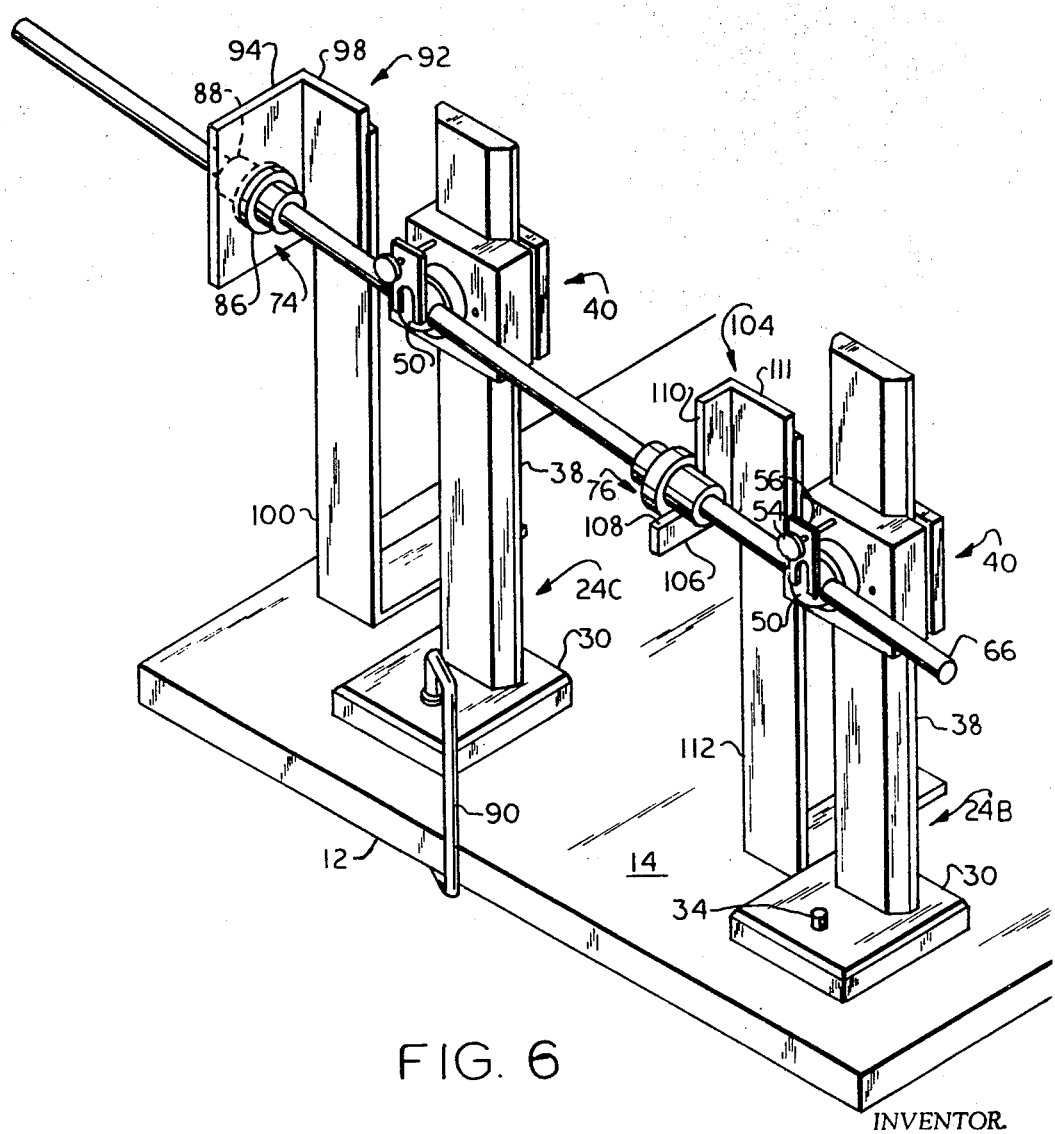
FIG. 6 is a pictorial view of the apparatus as it appears when weld locators are being positioned thereby.
Figure 7:
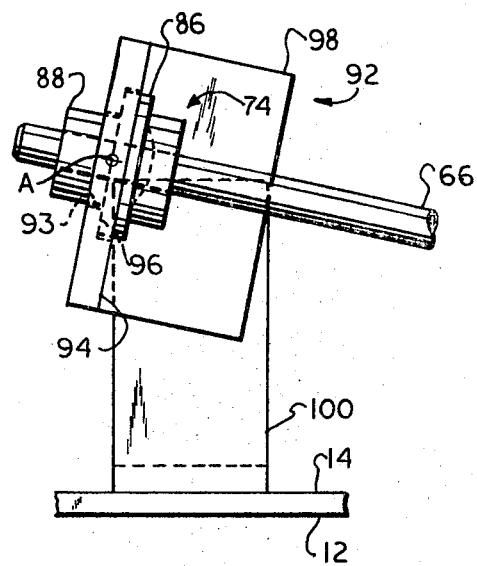
FIGS. 7 and 8 are detail view of the aforesaid weld locators and components shown in FIG. 6.
Figure 8:
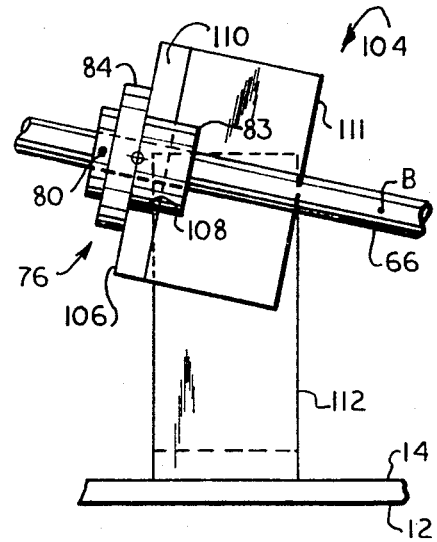

Illustrated in FIGS. 6 and 8 is an intermediate locator 104 which is used in conjunction with an end locator 92 to position each straight section of pipe 10 in proper position before the curved sections of the pipe are welded therebetween. Like the end locators, each intermediate locator 104 is L-shaped but one leg 106 thereof is itself L-shaped as best seen in FIG. 6. The diameter of portion 83 of locator ring 76 is substantially the same as that of pipe 10, and thus when the side of leg 106 of locator 104 is engaged with shoulder 84 of said locator ring as illustrated in FIGS. 6 and 8, shims (not shown) can be used to locate surfaces 108 and 110 of said leg 106 at predetermined distances (which will depend upon the tolerances allowed in forming pipe 10) from said portion 83 of said locator ring. Locator ring 76 is placed on rod 66 so that it is between points A and B on line AC when said rod has been coaxially aligned with said line by the procedure which has been described. After intermediate locator 104 has been positioned as illustrated in FIGS. 6 and 8, its leg 111 is fixedly secured by means of bolts and dowels (not shown) to a second angle 112. Stands 24B and 24C, rod 66, mounting members 50, and locator rings 74, 76, 86, and 88 are then removed, and a section of pipe having a length equal to the distance between points A and B in FIG. 1 is placed in coaxial relation with line AC of the same drawing by abutting one of its ends against shoulder 96 of the aperture 93 in end locator 92 and by locating the opposite end portion of said pipe at predetermined distances from surfaces 108 and 110 of intermediate locator 104.

Figure 9:
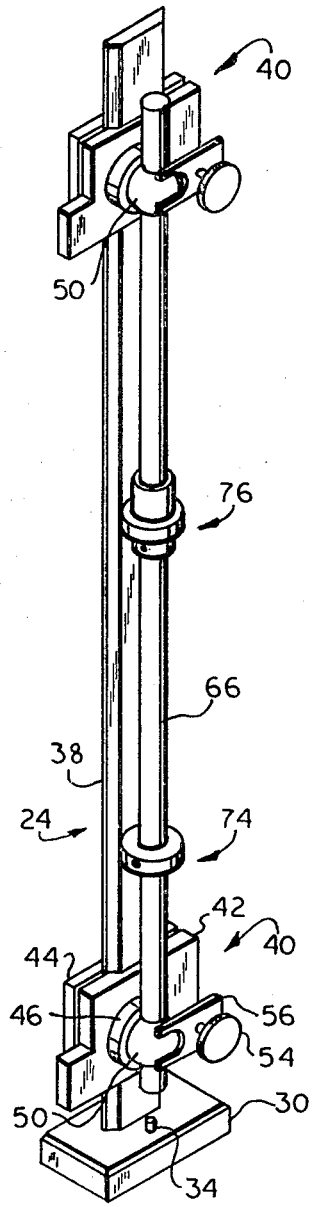

The step of locating mounting members 50 and locator ring 76 at the desired spacing on rod 66 can be accomplished by placing two elevation locators 40 on the post 38 of a single stand 24, as illustrated in FIG. 9, and using a height indicator (not shown) to locate surfaces 60 of said elevation locators at predetermined heights above the reference surface of support 12 to thereby space said surfaces apart at a distance equal to that between points A and C in FIG. 1.

Two mounting members 50 and locator rings 74 and 76 are placed on rod 66 as illustrated in FIG. 9, the mounting members are then respectively seated in the sockets 48 of the elevation locators on the post of the stand 24, the set screws 68 of the mounting members are tightened against said rod to secure the mounting members in fixed position on the latter, and clamping members 56 are engaged with the mounting members to hold them in fixed position on the elevation locators 40. By means of its set screw 80, locator ring 76 may also be fixed in position on rod 66 at a selected distance from the point on said rod which will be located at point B when the apparatus is arranged as illustrated in FIGS. 3 and 6. It is not necessary to fix locator ring 74 in position on rod 66 at this time since it is moved against the mounting member 50 which is subsequently secured to stand 24A, as described hereinbefore. As illustrated in FIG. 10, pins 72 may alternatively be respectively inserted in holes 70 of two mounting members 50, and after the latter have been placed on rod 66 the distance between their centers can be set by using a suitable measuring instrument, such as a caliper, to space said pins at a predetermined distance from each other. The procedure which has been described in connection with the location of a straight section of pipe between points A and B on line AC in FIG. 1 can of course also be followed to located straight sections of pipe between points D and E on line CF and between points G and H on line FH.

Various modifications in the disclosed apparatus can obviously be made without departing from the basic principles of the invention. For example, spherical mounting members 50 may be replaced by other suitable mounts which can be attached to a rod 66 at selected points thereon and which can also be attached to elevation locators 40 of stand 24 to thereby position said rod so that predetermined points on the axis thereof are respectively located on normals extending from predetermined points on a reference surface such as 14. The scope of the invention is therefore to be considered as being limited only by the terms of the following claims.

What is claimed as new and useful and desired to be secured by U. S. Letters Patent is:

1. Apparatus for use in positioning parts in predetermined locations, comprising:
    a support defining a reference plane;
    at least two stands locatable at predetermined positions on said support and each including an elevation locator adapted to be positioned at a predetermined distance from said reference plane;
    a rod; and
    two mounting members adapted to be fixed in predetermined axially spaced relation on said rod and respectively attachable to the elevation locators of said stands.

2. Apparatus for use in positioned parts in predetermined locations, comprising:
    a rod;
    a pair of mounting members slidably mounted on said rod;
    means for fixing said mounting members at different positions along said rod;
    a support having a flat reference surface thereon;
    a pair of stands each comprising a base, a post the longitudinal axis of which is perpendicular to said reference surface when said base is supported thereon, an elevation locator slidably mounted on said post, means for fixing said elevation locator at different positions along said post, and means for securing one of said mounting members to said elevation locator so that when said base is supported on said reference surface a line parallel with the latter passes through the longitudinal axes of said post and said rod; and
    means for securing the base of each of said stands to said support so that a line which is perpendicular to said reference surface and which intersects said parallel line and the longitudinal axis of said rod is maintained in coincidence with a predetermined point on said reference surface.

3. Apparatus as defined in claim 2 wherein the elevation locator of each stand is formed with a surface coplanar with the centerline of said socket and parallel with said reference surface when the base of said stand is supported thereon.

4. Apparatus as defined in claim 2 wherein:
    each mounting member is substantially spherical and formed with a first hole extending diametrically therethrough and a second hole extending transversely from said first hole to the outer surface of the mounting member, said rod being slidably disposed within said first hole, and a screw threadedly engaged within said second hole so as to engage said rod and fix the same relative to said mounting member; and
    each elevation locator is formed with a socket in which a portion of the outer surface of one of said mounting members can be seated, and said means for securing a mounting member to said elevation locator comprises a screw threadedly engaged within and projecting from a hole in the latter and a clamping member mounted on the outer end of said screw and engageable with said mounting member to hold the same in seated relation with said socket.

5. Apparatus as defined in claim 4 wherein:
    a third hole extends from said first hole perpendicularly thereof to the outer surface of each mounting member along a radius thereof; and including
    a pin adapted to be engaged within said third hole so as to project therefrom.

6. Apparatus as defined in claim 2 wherein:
    a hole extends through the base of each of said stands, the longitudinal axis of said hole being perpendicular to the bottom surface of said base and intersecting the centerline of the socket of the elevation locator associated with said base and the longitudinal axis of said rod when one of said mounting members is seated within said socket;
    a pin adapted to be slidably engaged within said hole in said base so as to project therefrom, said support being formed with a hole which extends perpendicularly from said reference surface thereof and in which the projecting portion of said pin can be removably seated.

7. Apparatus as defined in claim 2 including:
    at least one locator ring slidably engageable with said rod; and
    means for fixing said locator ring at different positions along said rod.

8. Apparatus as defined in claim 2 including:
    a first locator ring slidably engageable with said rod;
    means for fixedly positioning said first ring on said rod; and
    a second locator ring slidably engageable with said rod, whereby after said first locator ring has been fixedly positioned on said rod in abutment with one of said mounting members the latter can be removed from the rod and said second locator ring can be positioned thereon in abutment with said first locator ring to thereby locate a part at a plane which is perpendicular to the longitudinal axis of the rod and which included the center of said one mounting member before it was removed from said rod.

9. Apparatus as defined in claim 8 including:
    a third locator ring slidably engageable with said rod and having a diameter smaller than that of said second locator ring; and wherein
    said part is a locator having formed in one side thereof a hole in which said third locator ring can be slidably disposed to thereby align said locator relative to the longitudinal axis of said rod.

10. Method for positioning a part in a predetermined location, comprising:
    securing first and second stands in predetermined locations relative to a reference plane;
    fixing first and second mounting members in predetermined spaced relation on a rod and respectively securing said mounting members to said stands at predetermined distances from said reference plane;

fixing a locator ring at a predetermined point on said rod; and locating said part with reference to said locator ring.

11. Method for positioning a part in a predetermined location, comprising:

securing first and second stands in predetermined locations on a flat reference surface;

fixing first and second mounting members in predetermined axially spaced relation on a rod and respectively securing said mounting members to said stands at predetermined distances from said reference surface;

fixing a locator ring on said rod in abutment with one of said first and second mounting members;

fixing a third mounting member at a selected location on said rod and securing a third stand to said third mounting member and to said reference surface;

removing from said rod the mounting member which abuts said locator ring, and removing from said reference surface the stand associated with said removed mounting member; and locating said part with reference to said locator ring.

* * * * *